(12) United States Patent
Morgan et al.

(10) Patent No.: US 12,442,936 B2
(45) Date of Patent: Oct. 14, 2025

(54) INERTIAL COASTING POSITION AND VELOCITY SOLUTION SEPARATION

(71) Applicant: Honeywell International Inc., Charlotte, NC (US)

(72) Inventors: Kenneth Steven Morgan, St. Petersburg, FL (US); Ruth Dagmar Kreichauf, River Falls, WI (US); Benjamin Meier, Shakopee, MN (US)

(73) Assignee: Honeywell International Inc., Charlotte, NC (US)

( * ) Notice: Subject to any disclaimer, the term of this patent is extended or adjusted under 35 U.S.C. 154(b) by 947 days.

(21) Appl. No.: 17/575,250

(22) Filed: Jan. 13, 2022

(65) Prior Publication Data

US 2024/0337762 A1     Oct. 10, 2024

Related U.S. Application Data (60) Provisional application No. 63/210,442, filed on Jun. 14, 2021.

(51) Int. Cl.
*G01S 19/49*    (2010.01)
*G01S 19/21*    (2010.01)

(52) U.S. Cl.
CPC ............ *G01S 19/49* (2013.01); *G01S 19/215* (2013.01)

(58) Field of Classification Search
CPC ........ G01S 19/49; G01S 19/215; G01S 19/47; G01S 19/396; G01S 19/20; G01C 21/183
See application file for complete search history.

(56) References Cited

U.S. PATENT DOCUMENTS

| | | |
|---|---|---|
| 5,600,329 A | 2/1997 | Brenner |
| 5,760,737 A | 6/1998 | Brenner |

(Continued)

FOREIGN PATENT DOCUMENTS

CN    105509739 B  *  4/2018  .......... G01C 21/165

(Continued)

OTHER PUBLICATIONS

Brenner, Mats, "Integrated GPS/Inertial Fault Detection Availability", Navigation: Journal of The Institute of Navigation, vol. 43, No. 2, Summer 1996, pp. 111 through 130.

(Continued)

*Primary Examiner* — Rami Khatib
(74) *Attorney, Agent, or Firm* — Fogg & Powers LLC (57) ABSTRACT

An inertial coasting monitoring system comprises aiding sensors onboard a vehicle, including a GNSS receiver and at least one non-GNSS aiding sensor, and an inertial measurement unit (IMU) that produces inertial measurements for the vehicle. A navigation system is coupled to the aiding sensors and the IMU. The navigation system comprises a main navigation filter and an inertial navigation system (INS). The navigation filter receives aiding data from the aiding sensors including GNSS aided data, and the INS receives inertial data from the IMU. An onboard inertial coasting monitor communicates with the navigation system, and receives inertial data from the IMU and aiding data from at least one non-GNSS aiding sensor. The inertial coasting monitor comprises inertial coast sub-filters and communicates with the navigation filter. The inertial coasting monitor performs a position detection process and/or a velocity detection process to detect if there is a fault in the aiding data.

18 Claims, 4 Drawing Sheets

(56) References Cited

U.S. PATENT DOCUMENTS

| | | | |
|---|---|---|---|
| 5,926,132 A | 7/1999 | Brenner | |
| 5,969,672 A | 10/1999 | Brenner | |
| 6,271,789 B1 | 8/2001 | Beerhold | |
| 6,317,688 B1* | 11/2001 | Bruckner | G01C 21/005 |
| | | | 701/472 |
| 6,639,549 B2 | 10/2003 | Vanderwerf et al. | |
| 6,760,663 B2 | 7/2004 | Brenner | |
| 6,845,304 B1 | 1/2005 | Young | |
| 6,847,893 B1 | 1/2005 | Lupash | |
| 7,579,984 B2* | 8/2009 | Wang | G01C 21/165 |
| | | | 342/357.65 |
| 7,970,503 B2 | 6/2011 | Lapp et al. | |
| 8,928,527 B2 | 1/2015 | He et al. | |
| 9,978,285 B2 | 5/2018 | Khaghani et al. | |
| 2006/0122775 A1* | 6/2006 | Soehren | G01C 21/1652 |
| | | | 342/357.65 |
| 2009/0069960 A1* | 3/2009 | Lapp | G05D 1/0077 |
| | | | 701/16 |
| 2011/0084874 A1* | 4/2011 | Coatantiec | G01S 19/33 |
| | | | 342/357.3 |
| 2013/0006528 A1* | 1/2013 | Napolitano | G01C 21/188 |
| | | | 701/505 |
| 2015/0301188 A1* | 10/2015 | Broderick | G01S 19/23 |
| | | | 342/357.68 |
| 2017/0212248 A1* | 7/2017 | Bobye | G01C 21/18 |
| 2020/0326428 A1 | 10/2020 | Kana et al. | |

OTHER PUBLICATIONS

Escher et al., "GPS/IRS hybridization: definition of exclusion radius using solution separation method", IFIS 2002, 12th International Flight Inspection Symposium, Pages: Title Page through 11, Roma, Italy.
European Patent Office, "Extended European Search Report" from EP Application No. 22167253.8, from Foreign Counterpart to U.S. Appl. No. 17/575,250, filed Nov. 4, 2022, pp. 1 through 9, Published: EP.

* cited by examiner

INERTIAL COASTING POSITION AND VELOCITY SOLUTION SEPARATION

CROSS REFERENCE TO RELATED APPLICATION

This application claims the benefit of and priority to U.S. Provisional Application No. 63/210,442, filed on Jun. 14, 2021, which is herein incorporated by reference.

STATEMENT REGARDING FEDERALLY SPONSORED RESEARCH OR DEVELOPMENT

This invention was made with Government support under FA8576-20-C-0001 awarded by United States Airforce. The Government has certain rights in the invention.

BACKGROUND

Inertial navigation systems can be aided by many reference systems. Examples of such aiding systems include, but are not limited to, a Global Navigation Satellite System (GNSS) such as the Global Positioning System (GPS), Doppler systems, and position and velocity domain aiding sources. If the inertial system is of navigation grade quality, the inertial solution can be used to detect faults in the aiding source Measurement failure detection is a process of determining if measurements processed by a Kalman filter in the navigation system will corrupt or have corrupted an aided inertial navigation solution. Detecting measurements that will corrupt a navigation solution is generally performed by some type of residual measurement screening. Pre- and post-measurement processing residual tests can be used as instantaneous failure detection methods. While these methods are suitable for large and obvious failures such as step or spike errors, bias errors are not as easy to detect. The change in the error over one Kalman filter interval may not be large enough to be detected via residual screening. Once the biased measurements have been incorporated, the aided inertial navigation solution will be corrupted and tends to follow the error. This effect makes it more likely that additional biased measurements will be incorporated.

SUMMARY

An inertial coasting monitoring system comprises a plurality of aiding sensors onboard a vehicle, the aiding sensors including a GNSS receiver, and at least one non-GNSS aiding sensor. An onboard inertial measurement unit (IMU) is operative to produce inertial measurements for the vehicle. An onboard navigation system is operatively coupled to the aiding sensors and the IMU, the navigation system comprising a main navigation filter and an inertial navigation system (INS) operatively coupled to the main navigation filter. The main navigation filter is operative to receive aiding data from the aiding sensors including GNSS aided data. The INS is operative to receive inertial data from the IMU and generate an inertial navigation solution for the vehicle. An onboard inertial coasting monitor is in operative communication with the navigation system. The inertial coasting monitor is operative to receive inertial data from the IMU and aiding data from at least one non-GNSS aiding sensor. The inertial coasting monitor comprises a set of inertial coast sub-filters and is in operative communication with the main navigation filter. The inertial coasting monitor is operative to perform a position detection process and/or a velocity detection process.

The position detection process comprises: compute a position discriminator for each respective inertial coast sub-filter, with the position discriminator defined as a position error separation between the main navigation filter and each respective inertial coast sub-filter; compute a position threshold for each of the inertial coast sub-filters, with the position threshold defined as a position uncertainty separation between the main navigation filter and each inertial coast sub-filter; and compare the position discriminator to the position threshold, for each inertial coast sub-filter, to detect if there is a fault in the aiding data. The velocity detection process comprises: compute a velocity discriminator for each respective inertial coast sub-filter, with the velocity discriminator defined as a velocity error separation between the main navigation filter and each respective inertial coast sub-filter; compute a velocity threshold for each of the inertial coast sub-filters, with the velocity threshold defined as a velocity uncertainty separation between the main navigation filter and each inertial coast sub-filter; and compare the velocity discriminator to the velocity threshold, for each inertial coast sub-filter, to detect if there is a fault in the aiding data.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An aiding source fault detection system and method, using short term inertial coasting position and velocity solution separation, is described herein. The present system and method use solution separation techniques that employ a plurality of sub-filters operatively coupled to a main navigation filter of a vehicle, such as an aircraft. This allows the present approach to detect GNSS (e.g., GPS) failure scenarios that are not accounted for by prior failure detection systems. The present approach applies to any aiding source and is not limited to GPS failures.

Further details of various embodiments are described hereafter with reference to the drawings.

Figure 1A:
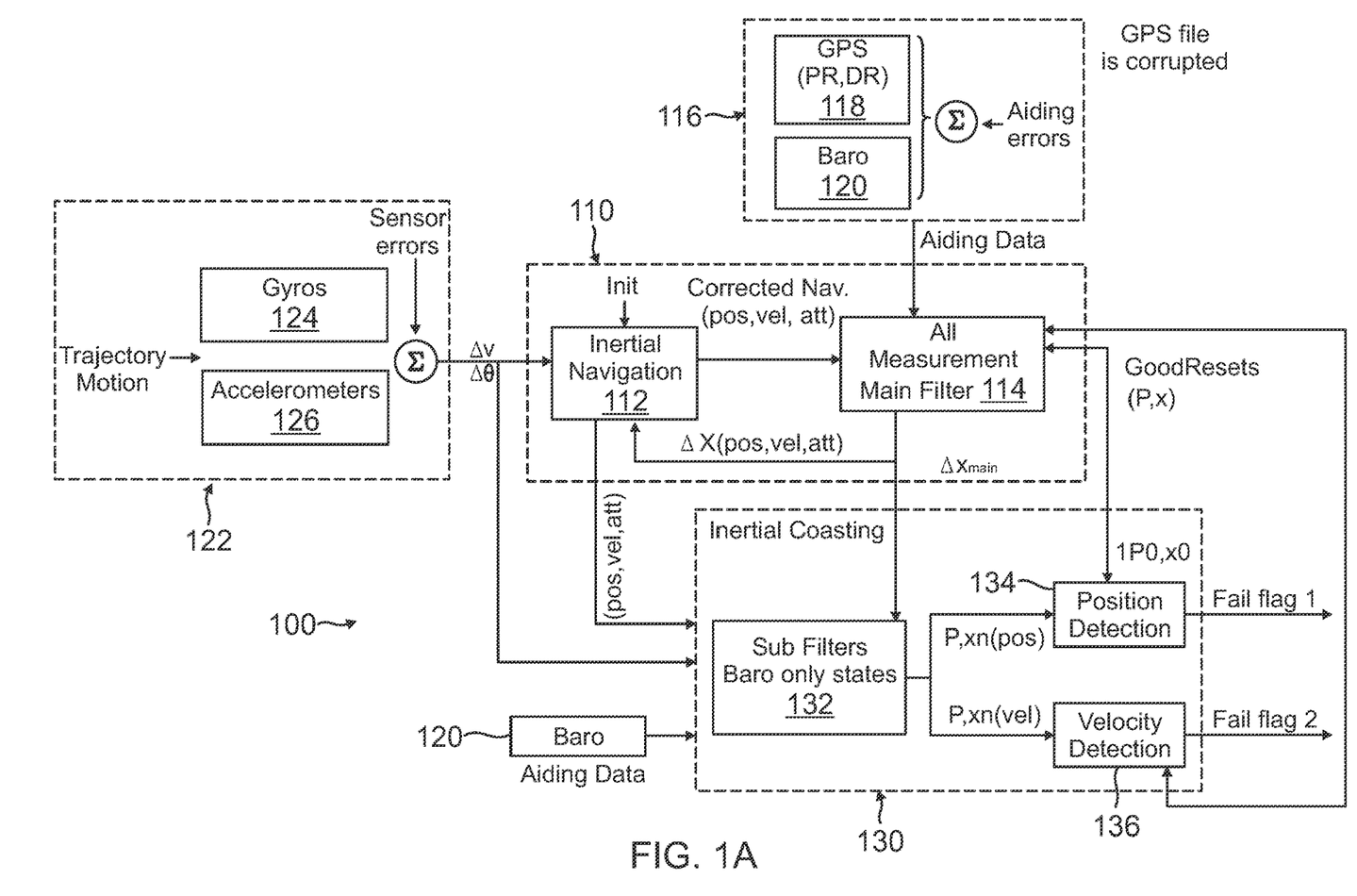
FIG. 1A is a block diagram of an inertial coasting monitoring system, according to one embodiment.

FIG. 1A is a block diagram of an inertial coasting monitoring system 100, according to one embodiment. The inertial coasting monitoring system 100 is configured to detect GPS threat events such as spoofing, which have a systemic effect on GPS signals that enter a navigation system of a vehicle, such as a navigation system 110. When GPS measurements are corrupted, the navigation solution will start to diverge because of the erroneous GPS signals that are received. The inertial coasting monitoring system 100 can be hosted in at least one processor onboard the vehicle.

As shown in FIG. 1A, navigation system 110 generally includes an inertial navigation system (INS) 112 that generates an inertial navigation solution, and an all measurement main filter 114 (main navigation filter), such as a Kalman filter, which is operatively coupled to INS 112 in a feedback loop.

The main filter 114 is configured to receive aiding data from an aiding source 116, such as GPS measurements from a GPS receiver 118 (i.e., pseudorange (PR) and delta-range (DR) measurements), barometric measurements from a barometric pressure sensor 120, or the like. The aiding data can include added aiding errors over time, which can occur when a GPS file is corrupted, for example.

The INS 112 is configured to receive inertial measurements from one or more inertial sensors 122, such gyroscopes 124 and accelerometers 126, which can be implemented in an inertial measurement unit (IMU). The gyroscopes 124 and accelerometers 126 respectively output data corresponding to changes in angle (4θ) and changes in velocity (Δv) as a result of the trajectory motion of the vehicle and can include added sensor errors over time.

The inertial navigation solution from INS 112 includes estimated vehicle kinematic state statistics (e.g., position (pos), velocity (vel), and attitude (att) of the vehicle), which are corrected over time based on feedback from main filter 114. The INS 112 is configured to generate the estimated vehicle kinematic state statistics based on integration of the inertial measurements from inertial sensors 122. However, errors can occur when the inertial measurements are integrated by INS 112, as the inertial sensors 122 can have measurement errors that, when integrated, grow over time. The aiding data are used by main filter 114 to generate an error correction signal ($\Delta x_{maink}$(pos, vel, att)) that is sent back to INS 112 to aid in correction of errors in the estimated vehicle kinematic state statistics.

An inertial coasting monitor 130 is configured to protect navigation system 110 from GPS threat events. The inertial coasting monitor 130 is in operative communication with INS 112 and main filter 114 of navigation system 110. The inertial coasting monitor 130 is also operative to receive inertial measurements from inertial sensors 122, and aiding data from a non-GPS aiding source, such as any altitude aiding sensor (e.g., barometric pressure sensor 120).

The inertial coasting monitor 130 employs a plurality of inertial coast (IC) sub-filters 132, which are not GPS aided (e.g., barometric only states), to determine the integrity of all GPS measurements. In this embodiment, since no aiding measurements are processed by the sub-filters other than pressure altitude, it is not necessary for the sub-filters to have aiding states other than pressure altitude states. In other embodiments, the sub-filters can be aided by other non-GPS aids, such as star trackers or Doppler velocity aiding.

Each sub-filter in the inertial coasting monitor provides a solution that has not processed aiding data for a given number of seconds. Because of this, these sub-filters are called "inertial coast" (IC) sub-filters. The IC sub-filters allow the highly accurate short term inertial coast capability of an embedded GPS/INS system for various "coast" times as a detection and recovery aid. Various numbers of IC sub-filters can be used in the present system, depending on the application. The criteria that drives the number of IC sub-filters depends on detection time, inertial drift, and available throughput.

The comparison of filter data can take place in the position domain (P,xn(pos)) such as in a position detection unit 134, and in the velocity domain (P,xn(vel)) such as in a velocity detection unit 136. Accordingly, the inertial coasting monitor 130 is operative to compute position and velocity discriminators for each of IC sub-filters 132, and position and velocity thresholds for each of IC sub-filters 132. The position or velocity discriminators are compared to respective position or velocity thresholds in each of IC sub-filters 132 to determine if there is a GPS threat event such as spoofing.

In the position domain, the comparison looks at the divergence of position errors between main filter 114 and each of the sub-filters 132. A failure will be declared (fail flag 1) if any of the sub-filters detect a failure. As shown in FIG. 1A, position detection unit 134 is also in operative communication with main filter 114.

In the velocity domain, the comparison looks at the divergence of velocities errors between main filter 114 and sub-filters 132. A failure will be declared (fail flag 2) if any of the sub-filters detect a failure. As shown in FIG. 1A, velocity detection unit 136 is also in operative communication with main filter 114.

Figure 1B:
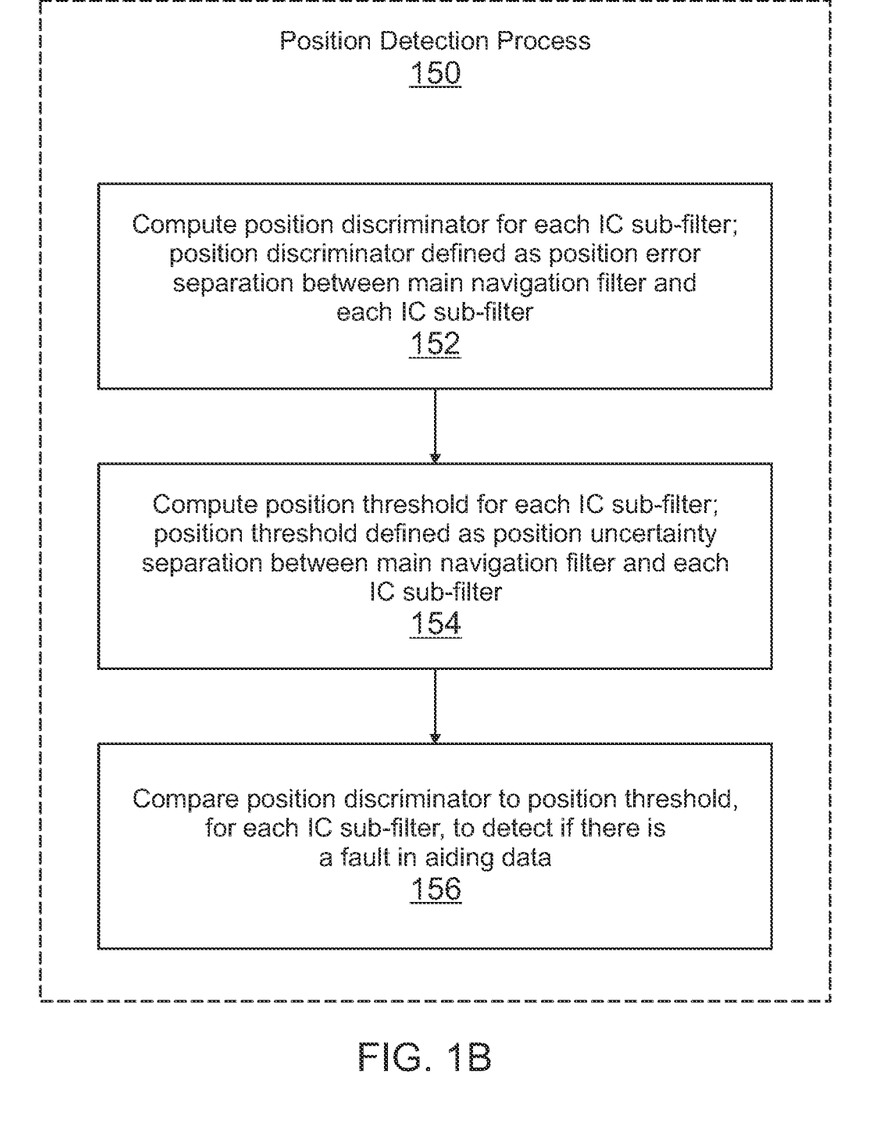
FIGS. 1B and 1C are functional block diagrams of position and velocity detection processes in an inertial coasting monitor, which can be employed in the inertial coasting monitoring system of FIG. 1A.
Figure 1C:
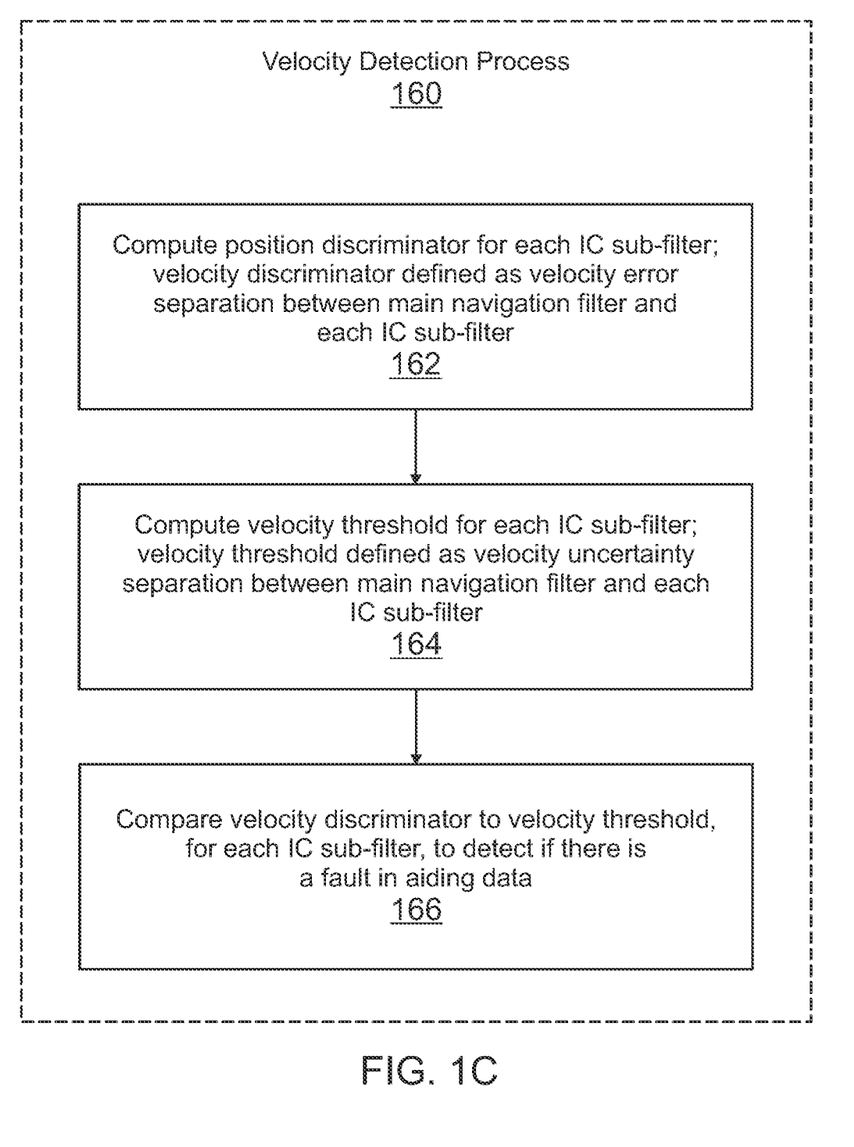

FIGS. 1B and 1C are functional block diagrams illustrating additional details of the operation of position and velocity detection processes in an inertial coasting monitor, such as inertial coasting monitor 130 (FIG. 1A). FIG. 1B shows a position detection process 150, which can be implemented by position detection unit 134 (FIG. 1A). The position detection process 150 comprises computing a position discriminator for each respective IC sub-filter, with the position discriminator defined as a position error separation between the main navigation filter and each respective IC sub-filter (block 152). The position detection process 150 then computes a position threshold for each of the IC sub-filters, with the position threshold defined as a position uncertainty separation between the main navigation filter and each IC sub-filter (block 154). Thereafter, position detection process 150 compares the position discriminator to the position threshold, for each IC sub-filter, to detect if there is a fault in the aiding data (block 156).

In one implementation, the position discriminator comprises a horizontal position discriminator and a vertical position discriminator for each IC sub-filter. The horizontal position discriminator is defined as a horizontal position error separation between the main navigation filter and each IC sub-filter. The vertical position discriminator is defined as a vertical position error separation between the main navigation filter and each IC sub-filter.

FIG. 1C shows a velocity detection process 160, which can be implemented by velocity detection unit 136 (FIG. 1A). The velocity detection process 160 comprises computing a velocity discriminator for each respective IC sub-filter, with the velocity discriminator defined as a velocity error separation between the main navigation filter and each respective IC sub-filter (block 162). The velocity detection process 160 then computes a velocity threshold for each of the IC sub-filters, with the velocity threshold defined as a velocity uncertainty separation between the main navigation filter and each IC sub-filter (block 164). Thereafter, the velocity detection process 160 compares the velocity discriminator to the velocity threshold, for each IC sub-filter, to detect if there is a fault in the aiding data (block 166).

In one implementation, the velocity discriminator comprises a horizontal velocity discriminator and vertical velocity discriminator for each IC coast sub-filter. The horizontal velocity discriminator is defined as the horizontal velocity error separation between the main navigation filter and each IC sub-filter. The vertical velocity discriminator is defined as a vertical velocity error separation between the main navigation filter and each IC sub-filter.

Figure 2:
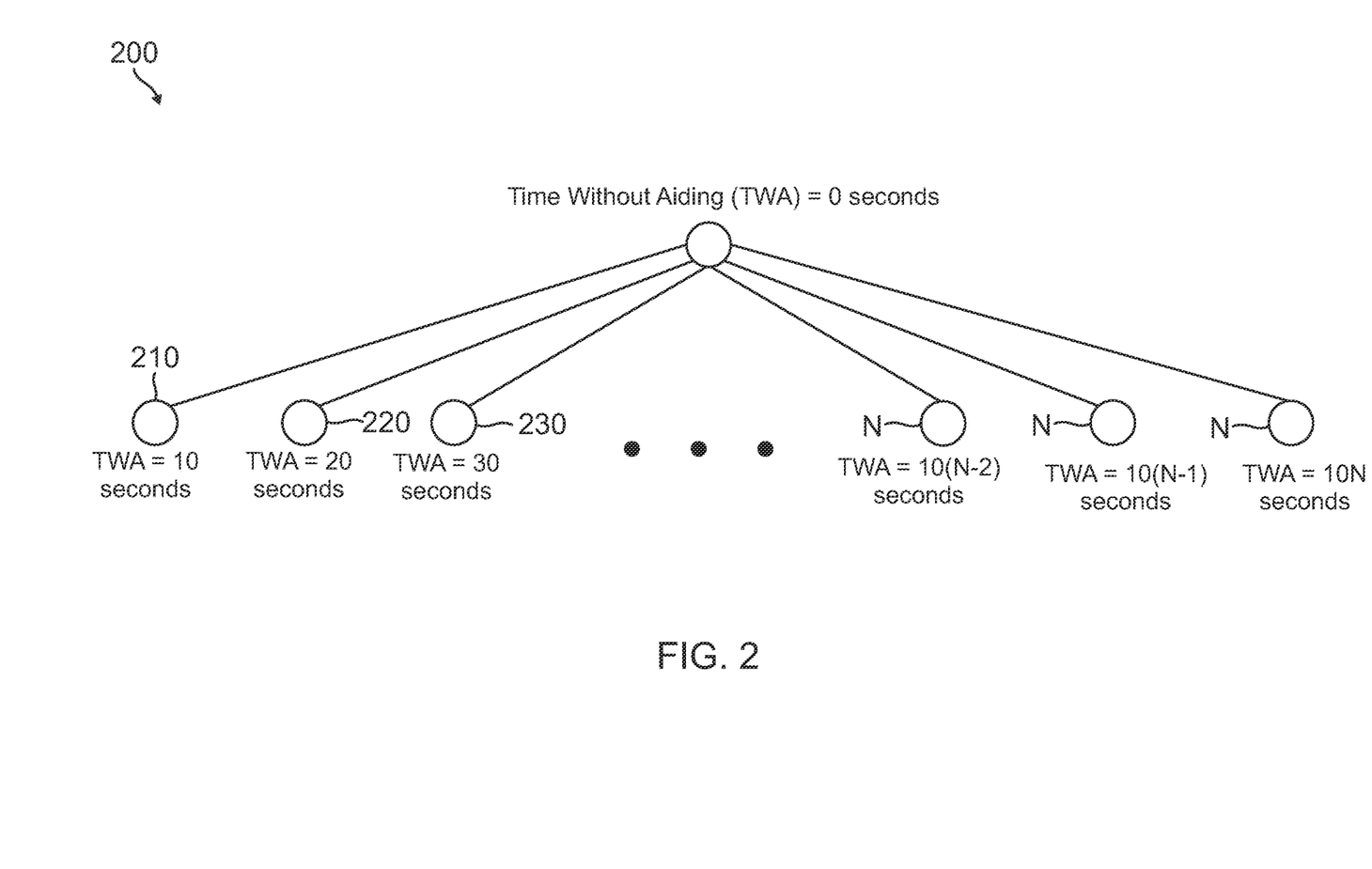
FIG. 2 is a schematic representation of a plurality of sub-filters with a Time Without Aiding (TWA) indicated for each sub-filter, according to one implementation, which can be employed in the inertial coasting monitoring system of FIG. 1A.

FIG. 2 is a schematic representation 200 of N IC sub-filters with a Time Without Aiding (TWA)=10*N indicated for each IC sub-filter, according to one implementation, which can be employed in inertial coasting monitoring system 100 of FIG. 1A. For example, as shown in FIG. 2, a first IC sub-filter 210 will have not processed aiding for 10 seconds (i.e., 10 Kalman filter (KF) cycles). A second IC sub-filter 220 will have not processed aiding for 20 seconds (20 KF cycles). A third IC sub-filter 230 will have not processed aiding for 30 seconds (30 KF cycles). Additional IC sub-filters N will have not processed aiding for 10*N seconds (10*N KF cycles). A failure will be declared (fail flag) if any of the IC sub-filters detect a failure. Aiding exclusion involves reverting to the sub-filter least likely to be affected by the GPS threat event. This can be the TWA=10*N IC sub-filter, or the IC sub-filter that detects the failure for the shortest period of time or sometime in-between.

In one example, N can be set to 30 to allow for five minutes of inertial coast. Because of this, the selected IC sub-filter will be the filter that gets promoted to replace the current blended solution.

Further details of the inertial coasting monitoring system and method are described in the following sections.

1. All Measurement Filter and Inertial Coast Sub-Filter Hierarchy

In the present inertial coasting implementation, an all measurement filter such as an all measurement Kalman filter is employed. The all measurement Kalman filter organization contains the following information: 1) filter error state; 2) filter UD matrix. The all measurement Kalman filter can be either a primary blended navigation filter, or can be some type of alternate aiding source navigation sub-filter. The inertial coast sub-filter organization contains the following information: 1) inertial coast sub-filter error state; and 2) inertial coast sub-filter UD matrix.

2. Error State

A general navigation solution provides various navigation states, such as position, velocity, and attitude, to a navigation system. There are three types of elements in an error state: dynamic errors that represent the position, velocity, and alignment errors of the navigation system; inertial sensor compensation errors; and aid compensation errors. Because the only measurement processed by the inertial coast Kalman filters is pressure altitude, only the pressure altitude bias and scale factor states are modeled. The dynamic errors are governed by non-trivial equations, described below, and are coupled into each other. The inertial sensor compensation errors are governed by simple equations formulated to give them the appropriate statistical character. The inertial sensor compensation errors are not coupled into each other, but are coupled into the dynamic errors. The aid compensation errors also have simple governing equations, and are coupled into neither the dynamic errors nor the inertial sensor compensation errors. The pressure altitude observation states have no coupling either.

3. Inertial Coast Foreground Processing

The time base of the Kalman filter data needs to be propagated to the current time of the blended Kalman filter. This is accomplished by using the current value of the state transition matrix defined in equation (3.1) below, the current accumulation of state process noise defined in equation (4.3.2) below, and the current accumulation of state feedbacks defined in equation (4.2.2) below. The state propagation is defined as the following:

$$x = \prod_{i=k}^{k+m-1} \begin{bmatrix} \Phi_{i+1,i}^{ss,1} & \\ 0 & \Phi_{i+1,i}^{ss,2} \end{bmatrix} x_{IC} - \left( \sum_{j=0}^{n-1} \left( \left[ \prod_{i=k+j}^{k+m-1} \Phi_{i+1,i}^{kf\_ss} \right] \delta x_{k+j}^{kf\_ss} \right) + \delta x_{k+m}^{kf\_ss} \right) \quad (3.1)$$

where:
m is the current count, $$\prod_{i=k}^{k+m-1} \begin{bmatrix} \Phi_{i+1,i}^{ss,1} & \\ 0 & \Phi_{i+1,i}^{ss,2} \end{bmatrix}$$

is the current value of the formation of the inertial coast state transition matrix as defined in equation (4.1.4) below, which defines the transition from time step k to time step m, and $$\sum_{j=0}^{n-1} \left( \left[ \prod_{i=k+j}^{k+m-1} \Phi_{i+1,i}^{kf\_ss} \right] \delta x_{k+j}^{kf\_ss} \right) + \delta x_{k+m}^{kf\_ss}$$

is the current accumulated and propagated state feedback from time step k to time step m. It is the current value of the ongoing calculation in equation (4.2.2) below.

The matrix $U_{IC}$ is propagated with the current state transition matrix from equation (4.1.4) below. Current process noise is used in the propagation also. The blended Kalman filter also needs the current status of the fault detect flag. If the solution separation fault detect flag is set true, the flag for the blended Kalman filter is also set true. If solution separation has detected an aiding device failure, the blended Kalman filter needs to be set to the appropriate sub-filter. One approach is to set the solution to the filter with the largest test statistic.

After the error free Kalman filter has been propagated to the current blended filter time, the error free Kalman filter must replace the blended Kalman filter. Since the solution separation Kalman filters maintain a subset of the states in the blended Kalman filter, the non-common states must be re-initialized. In essence, the inverse of the below equations (4.1.2) and (4.1.3) must be performed as well as mapping the state vectors. Integrated velocity states are examples of states that are not common. It is not necessary to re-initialize the integrated velocity states since they are always reset on every filter cycle. If the blended Kalman filter is configured to contain Doppler states, the Doppler states must be reset and their variances must be set to their initial condition.

4. After Blended Kalman Solution Separation Foreground Processing

Initialization of the solution separation filters occurs when the blended Kalman filter transitions to the fine_init mode. When initialization occurs, the solution separation time is set to zero, the solution separation background feedback vector is set to zero, and the vector that controls clearing of states is set to false.

The next step is to initialize the all measurement filter to the current contents of the blended Kalman filter. Since the all measurement filter is a sub-set of the blended Kalman filter, the all measurement UD matrix is set to the common elements of the blended Kalman filter UD matrix. The all measurement filter error state vector is set to the common elements of the blended Kalman filter error state vector.

In addition, any debug variables (such as sum of chi's, chi square reject and accepts counters, etc.) are set to their appropriate initial conditions. Additional elements that will be initialized at this time include: the all measurement filter measurement residual vector; the current variances output of the all measurement filter; the count of rank 1 errors; the variance vector; the sum of all chi's; and the accept and reject counters. After initialization of the all measurement filter is complete, the solution separation mode is set to init.

4.1 Formation of State Transition Matrix for Solution Separation Filters

As part of solution separation foreground processing, the state transition matrix is formed. The generic equation for generating the state transition matrix for the solution separation filters from the blended Kalman filter is given by the following equation:

$$\Phi_{s,s-1}^{ss} = \prod_{i=k}^{k+n-1} \Phi_{i+1,i}^{kf} \tag{4.1.1}$$

where:
S is the index representing the current solution separation cycle,
n is the number of blended Kalman filter cycles in any solution separation cycle,
k is an index representing the initial blended Kalman cycle,
SS represents the solution separation filter,
kf represents the blended Kalman filter,
$\Phi_{i+1,i}^{kf}$ is the blended Kalman filter state transition matrix from time step i to time step i+1, and
$\Phi_{s,s-1}^{ss}$ is the solution separation Kalman filter state transition matrix from time step s−1 to time step s.

The actual equation implemented is more complex than this because the state transition matrix is separated into two sections. The first section of the state transition matrix is a matrix of dimension N_Part_1×N_States. N_States is the number of states in the blended Kalman filter. N_Part_1 is the number of states in the first partition of the blended Kalman filter. By definition, the state dynamics matrix of the states in the second partition of the Kalman filter can be represented by a diagonal matrix. This allows for some computational efficiency. In addition, since the states in the solution separation Kalman filters are a subset of the states in the blended Kalman filter, only the common states are used.

The solution separation subset of the first partition of the state transition matrix is formed from the first partition of the blended Kalman filter state transition matrix:

$$\Phi_{i+1,i}^{kf\_ss,1} \subseteq \Phi_{i+1,i}^{kf,1} \tag{4.1.2}$$

The diagonal matrix portion of the state transition matrix is formed as a subset of the diagonal matrix portion of the blended Kalman filter state transition matrix:

$$\Phi_{i+1,i}^{kf\_ss,2} \subseteq \Phi_{i+1,i}^{kf,2} \tag{4.1.3}$$

The state transition matrix for the solution separation filters is formed from the partitioned matrix:

$$\begin{bmatrix} \Phi_{s,s-1}^{ss,1} & \\ 0 & \Phi_{s,s-1}^{ss,2} \end{bmatrix} = \prod_{i=k}^{k+n-1} \begin{bmatrix} \Phi_{i+1,i}^{ss,1} & \\ 0 & \Phi_{i+1,i}^{ss,2} \end{bmatrix} \tag{4.1.4}$$

where:
n_part2=n_states−n_part1,
$\Phi_{s,s-1}^{ss,1}$ is a matrix of size n_states by n_part1,
0 is a zero matrix of size n_part1 by n_part2, and
$\Phi_{s,s-1}^{ss,2}$ is a diagonal matrix of size n_part2 by n_part2.

4.2 Formation of Error State Feedback for Solution Separation Filters

The blended Kalman filter updates the navigation solution at the blended Kalman filter rate. The effect of the time varying application of these feedback corrections needs to be accounted for in the solution separation filter design. In addition, the sequence of the solution separation processing relative to the blended Kalman filter processing must be accounted for.

At the end of a Kalman filter cycle, the feedback data available is the feedback that will be applied immediately after the next Kalman filter sample. The feedback vector from the previous Kalman filter cycle is the feedback that was applied after the current available sample data. The feedback vector from two cycles previous is the feedback vector that was applied prior to the start of the current cycles Kalman data.

The solution separation processing must keep track of all of the Kalman filter feedback corrections that were applied both prior to the final sample pass and at the final sample pass. First, the solution separation error state vector that is a subset of the blended Kalman filter error state is obtained as shown in Equation (4.2.1). As stated previously, this vector represents the feedback that will be applied immediately after the next Kalman filter cycle.

$$\delta x_{k+i+1}^{kf\_ss} \subseteq \delta x_{k+i+1}^{kf} \tag{4.2.1}$$

By correctly buffering the data from equation (4.2.1), the feedback corrections applied over the entire solution separation period can be formed. Equation (4.2.2) below shows the formation of this feedback vector, which represents all of the feedback corrections that were applied to the blended navigation solution prior to the sample pass. In equation (4.2.2), the final feedback vector is the sum of all of the feedback vectors propagated forward to the time of the solution separation filter.

$$\delta x_s^{ss} = \sum_{j=1}^{n-1} \left( \left[ \prod_{i=k+j}^{k+n-1} \Phi_{i,i-1}^{kf\_ss} \right] \delta x_{k+j-1}^{kf\_ss} \right) + \delta x_{k+n-1}^{kf\_ss} \tag{4.2.2}$$

In addition, the feedback corrections that were applied on the sample pass, $\delta x_{k+n}^{kf\_ss}$, must be passed to the solution separation background processing.

4.3 Formation of Process Noise for Solution Separation Filters

The process noise of the solution separation Kalman filters is formed from the process noise of the blended Kalman filter as follows. First, the process noise vector is formed from the blended Kalman filter for the error states that exist in the solution separation Kalman filters, expressed as:

$$Q_{k+n}^{kf\_ss} \subseteq Q_{k+n}^{kf} \quad (4.3.1)$$

Next, the process noise for the solution separation filter pass is formed as the sum of the process noise vectors from equation (4.3.1) for each filter pass, expressed as:

$$Q_s^{ss} = \sum_{j=0}^{n-1} (Q_{k+j}^{kf\_ss}) \quad (4.3.2)$$

5. Inertial Coast Solution Separation Kalman Filter Processing

In the solution separation initialization, the all measurement filter is set to the current value of the blended Kalman filter.

5.1 Primary Processing

The following section describes the standard processing for each solution separation Kalman filter. This processing includes time propagation and measurement updates of the error states and covariance matrices. Prior to this processing, a filter re-initialization must occur if a GPS threat was detected.

Now that each solution separation Kalman filter has been propagated to the current available sample time, it is appropriate to control the activity of all of the Kalman filters. This filter manager logic is described below. The only measurement processed by the IC solution separation filters is pressure altitude. After all measurements have been applied to a filter or sub-filter, the state feedback obtained from equation (4.2.2) is applied to all filters. The application of this state feedback allows each filter to follow the operation of the blended KF, expressed as:

$$x_i = x_i - \delta x_s^{ss} \quad (5.1)$$

The next logical step is to perform solution separation fault detection. This feature is described hereafter. If a fault is detected, the following step is to perform fault exclusion, which is also described hereafter.

5.2 Solution Separation Kalman Filter Manager

The purpose of this section is to organize the Kalman filter structure and to initialize all the sub-filters. The general solution separation structure is described above and illustrated in FIG. 2. All of the inertial coast solution separation Kalman filters are organized in a circular buffer. First, the oldest element in the circular buffer is updated with the most recent blended Kalman filter. This filter is labeled the all measurement Kalman filter and given the index of 0. Filter 1 (TWA=10) is the previous element in the circular buffer. Filters 2 (TWA=20) through N (TWA=N*10) are the next previous elements in the circular buffer.

6. Fault Detection

The fault detection methods implemented in the inertial coast solution separation includes horizontal position and velocity fault detection schemes, and vertical position and velocity fault detection schemes.

6.1 Horizontal Position Fault Detection

The horizontal position discriminator for each sub-filter is defined as the horizontal position solution separation between the primary filter and the sub-filter. That is:

$$dx_n = x_0 - x_n; n = 1, N_{subfilt} \quad (6.1.1)$$

where:
$x_0$ is the all measurement Kalman filter state vector,
$x_n$ is the sub-filter that has not processed aiding data for $n\Delta t_{rate8}$ seconds,
$N_{subfilt}$ is the number of inertial coast sub-filters, and $$d_n = \sqrt{[dx_n(\xi_1)]^2 + [dx_n(\xi_2)]^2} \quad (6.1.2)$$

where:
$dx_n(\xi_1)$, $dx_n(\xi_2)$ are the differences in the horizontal position components of the error state vector.

The threshold is set based on the covariance of the separation defined in the following equation:

$$\begin{aligned} dP_n &= E[dx_n dx_n^T] = E[(x_0 - x_n)(x_0 - x_n)^T] \\ &= E[x_0 x_0^T] - E[x_0 x_n^T] - E[x_n x_0^T] + E[x_n x_n^T] \\ &= P_n - P_0 \end{aligned} \quad (6.1.3)$$

The maximum eigenvalue $\lambda^{dP_n(1:2,1:2)}$ of the 2×2 matrix formed from the horizontal position error elements of the separation covariance represents the variance in the worst case direction. Since a Kalman filter UD matrix is maintained instead of a covariance matrix, the 2×2 elements of the horizontal position covariance matrix need to be obtained by the equation $P=UDU^T$. Note that the full matrix multiply need not be formed, only the portion associated with forming the 2×2 horizontal position covariance matrix.

The horizontal position separation uncertainty is formed assuming a circular distribution from the largest eigenvalue of the horizontal position covariance matrix, as defined below:

$$\sigma_{dP_n} = \sqrt{\lambda^{d_n(1:2,1:2)}} \\ = \sqrt{\frac{dP_n(1,1) + dP_n(2,2)}{2} + \sqrt{\left(\frac{dP_n(1,1) - dP_n(2,2)}{2}\right)^2 + (dP_n(1,2))^2}} \quad (6.1.4)$$

The circular distribution assumption leads to a Rayleigh distribution assumption for horizontal position errors. This is based on the idea that the magnitude of the horizontal position difference is the result of taking the magnitude of two normally distributed terms. This results in a distribution that is no longer zero mean and has the shape consistent with the Rayleigh distribution.

The inverse of the error function is taken for the Rayleigh distribution. Because this distribution is one sided there is no need for the divide by 2 operation that would be present in the normal distribution case. The equation for the detection threshold becomes:

$$D_n = \sigma_{d_n} \text{erfc}_{Rayleigh}^{-1}\left(\frac{p_{fa}}{N}\right) \quad (6.1.5)$$

where:
p$_{fa}$=probability of false alert per independent sample, and N is the number of tests per sample. For IC solution separation this is the number of active and independent sub-filters. The term $$\text{erfc}_{Rayleigh}^{-1}\left(\frac{p_{fa}}{N}\right)$$

is evaluated from the Rayleigh probability distribution function:

$$\frac{p_{fa}}{N} = 1 - e^{\left(\frac{-r^2}{2\sigma^2}\right)}. \quad (6.1.6)$$

The required false alert rate must be converted to the equivalent probability of false alert per independent sample. Each filter sample is considered independent if a measurement other than a pressure altitude measurement has been processed by the blended Kalman filter:

$$P_{fa} = \frac{1 \times 10^{-5}}{\text{hour}}\left(\frac{\text{hour}}{3600 \text{ sec}}\right)\left(\frac{10 \text{ sec}}{\text{sample}}\right) = 2.778 \times 10^{-8}/\text{sample} \quad (6.1.7)$$

A horizontal test statistic is created from each active and independent sub-filter:

$$T_n = \frac{d_n}{D_n}. \quad (6.1.8)$$

6.2 Horizontal Velocity Fault Detection

The horizontal velocity discriminator for the sub-filter is defined as the horizontal velocity solution separation between the primary filter and the sub-filter. That is:

$$dx_n = x_0 - x_n; n = 1, N_{subfilt} \quad (6.2.1)$$

where:
$x_0$ is the all measurement Kalman filter state vector,
$x_n$ is the sub-filter that has not processed aiding data,
$N_{subfilt}$ is the number of sub-filters, and $$d_n = \sqrt{[dx_n(\zeta_1)]^2 + [dx_n(\zeta_2)]^2} \quad (6.2.2)$$

where:
$dx_n(\xi_1)$, $dx_n(\xi_2)$ are the differences in the horizontal velocity components of the error state vector.

The threshold is set based on the covariance of the separation as defined in the following equation:

$$\begin{aligned}dP_n &= E[dx_n dx_n^T] = E[(x_0 - x_n)(x_0 - x_n)^T] \\ &= E[x_0 x_0^T] - E[x_0 x_n^T] - E[x_n x_0^T] + E[x_n x_n^T] \\ &= P_n - P_0\end{aligned} \quad (6.2.3)$$

The maximum eigenvalue $\lambda^{dP_n(1:2,1:2)}$ of the 2×2 matrix formed from the horizontal velocity error elements of the separation covariance represents the variance in the worst case direction. Since a Kalman filter UD matrix is maintained instead of a covariance matrix, the 2×2 elements of the horizontal position covariance matrix need to be obtained by the equation P=UDU$^T$. Note that the full matrix multiply need not be formed, only the portion associated with forming the 2×2 horizontal position covariance matrix.

The horizontal position and velocity separation uncertainty is formed assuming a circular distribution from the largest eigenvalue of the horizontal position and velocity covariance matrix, as defined below:

$$\sigma_{dP_n} = \sqrt{\lambda^{d_n(1:2,1:2)}} \quad (6.2.4)$$

$$= \sqrt{\frac{dP_n(1,1) + dP_n(2,2)}{2} + \sqrt{\left(\frac{dP_n(1,1) - dP_n(2,2)}{2}\right)^2 + (dP_n(1,2))^2}}$$

The circular distribution assumption leads to a Rayleigh distribution assumption for horizontal position and velocity errors. This is based on the idea that the magnitude of the horizontal position and velocity difference is the result of taking the magnitude of two normally distributed terms. This results in a distribution that is no longer zero mean and has the shape consistent with the Rayleigh distribution.

The inverse of the error function is taken for the Rayleigh distribution. Because this distribution is one sided there is no need for the divide by 2 operation that would be present in the normal distribution case. The equation for the detection threshold becomes:

$$D_n = \sigma_{d_n} \text{erfc}_{Rayleigh}^{-1}\left(\frac{p_{fa}}{N}\right) \quad (6.2.5)$$

where:
p$_{fa}$=probability of false alert per independent sample, and N is the number of tests per sample.
For the alternate aiding solution separation this is the number of active and independent sub-filters, i.e., one. The term $$\text{erfc}_{Rayleigh}^{-1}\left(\frac{p_{fa}}{N}\right)$$

is evaluated from the Rayleigh probability distribution function:

$$\frac{p_{fa}}{N} = 1 - e^{\left(\frac{-r^2}{2\sigma^2}\right)}. \quad (6.2.6)$$

The required false alert rate must be converted to the equivalent probability of false alert per independent sample. Each filter sample is considered independent if a measurement other than a pressure altitude measurement has been processed by the blended Kalman filter:

$$P_{fa} = \frac{1 \times 10^{-5}}{\text{hour}} \left(\frac{\text{hour}}{3600 sec}\right)\left(\frac{10 sec}{\text{sample}}\right) = 2.778 \times 10^{-8}/\text{sample}. \quad (6.2.7)$$

The system will create two horizontal (position and velocity) test statistics for each sub-filter:

$$T_n = \frac{d_n}{D_n}. \quad (6.2.8)$$

6.3 Vertical Position Fault Detection

The vertical position discriminator for each sub-filter is defined as the vertical position solution separation between the primary filter and the sub-filter. The vertical position separation covariance is obtained from the vertical position element of the separation covariance. Since a Kalman filter UD matrix is maintained instead of a covariance matrix, the 2×2 elements of the vertical position covariance matrix need to be obtained by the equation $P=UDU^T$. Note that the full matrix multiply need not be formed, only the portion associated with forming the 2×2 vertical position covariance matrix. The cross covariance matrix has the vertical position covariance available directly:

$$d_n^{vert} = |dx_n(\xi_3)| \quad (6.3.1)$$

Evaluation of the following equation will provide:

$$D_n^{vert} = \sigma_{d_n^{vert}} \text{erfc}_{Gaussian}^{-1}\left(\frac{p_{fa}}{2N}\right) \quad (6.3.2)$$

$$\sigma_{d_n^{vert}} = \sqrt{dP_n(\xi_3, \xi_3)} \quad (6.3.3)$$

where:
$\text{erfc}_{Gaussian}^{-1}(p_{fa}/2N)$ is the inverse compliment of the error function representing a Gaussian normal distribution.

The system will create a vertical test statistic for each active and independent sub-filter:

$$T_n^{vert} = \frac{d_n^{vert}}{D_n^{vert}}. \quad (6.3.4)$$

6.4 Vertical Velocity Fault Detection

The vertical velocity discriminator for the sub-filter is defined as the vertical velocity solution separation between the primary filter and the sub-filter. The vertical velocity separation covariance is obtained from the vertical velocity element of the separation covariance.

Since a Kalman filter UD matrix is maintained instead of a covariance matrix, the 2×2 elements of the vertical position covariance matrix need to be obtained by the equation $P=UDU^T$. Note that the full matrix multiply need not be formed, only the portion associated with forming the 2×2 vertical position covariance matrix. The cross covariance matrix has the vertical velocity covariance available directly:

$$d_n^{vert} = |dx_n(\zeta_3)| \quad (6.4.1)$$

The $P_{fa}$ follows the same assumptions as for HPL. Evaluation of the following equation will provide:

$$D_n^{vert} = \sigma_{d_n^{vert}} \text{erfc}_{Gaussian}^{-1}\left(\frac{p_{fa}}{2N}\right) \quad (6.4.2)$$

$$\sigma_{d_n^{vert}} = \sqrt{dP_n(\zeta_3, \zeta_3)} \quad (6.4.3)$$

where:
$\text{erfc}_{Gaussian}^{-1}(p_{fa}/2N)$ is the inverse compliment of the error function representing a Gaussian normal distribution.

The system will create two vertical (position and velocity) test statistics for each sub-filter:

$$T^{vert} = \frac{d^{vert}}{D^{vert}}. \quad (6.4.4)$$

6.5 Declaring a Test Failure

The solution separation implementation will declare a fault if either the horizontal test statistic or the vertical test statistic for any inertial coast sub-filter exceeds one. In other words, if:

$$T_{0n} > 1 \text{ or } T_{0n}^{vert} > 1 \quad (6.5.1)$$

for any independent and active sub-filter, then a fault is declared. If a fault is declared, then the blended Kalman filter will not process aiding measurements until the fault clears. This is accomplished by passing this information to the blended Kalman filter.

7. Inertial Coast Solution Separation Fault Exclusion

The assumption in fault exclusion is that at least one of the inertial coast sub-filters is fault free. Exclusion is accomplished by selecting the most probable inertial coast sub-filter with the minimum inertial coast time. As stated before, when a fault has been detected, the all measurement filter is replaced with the barometric only aided sub-filter that has not processed GPS measurements.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: a plurality of aiding sensors onboard a vehicle, the aiding sensors including a Global Navigation Satellite System (GNSS) receiver, and at least one non-GNSS aiding sensor; an onboard inertial measurement unit (IMU) operative to produce inertial measurements for the vehicle; a navigation system onboard the vehicle, the navigation system operatively coupled to the aiding sensors and the IMU, the navigation system comprising a main navigation filter and an inertial navigation system (INS) operatively coupled to the main navigation filter, wherein the main navigation filter is operative to receive aiding data from the aiding sensors including GNSS aided data, and the INS is operative to receive inertial data from the IMU and generate an inertial navigation solution for the vehicle; and an onboard inertial coasting monitor in operative communication with the navigation system, the inertial coasting monitor operative to receive inertial data from the IMU and aiding data from at least one non-GNSS aiding sensor, the inertial coasting monitor comprising a set of inertial coast sub-filters, the inertial coasting monitor in operative communication with the main navigation filter, the inertial coasting monitor operative to perform a position detection process and/or a velocity detection process; wherein the position detection process comprises: compute a position discriminator for each respective inertial coast sub-filter, with the position discriminator defined as a position error separation between the main navigation filter and each respective inertial coast sub-filter; compute a position threshold for each of the inertial coast sub-filters, with the position threshold defined as a position uncertainty separation between the main navigation filter and each inertial coast sub-filter; and compare the position discriminator to the position threshold, for each inertial coast sub-filter, to detect if there is a fault in the aiding data; wherein the velocity detection process comprises: compute a velocity discriminator for each respective inertial coast sub-filter, with the velocity discriminator defined as a velocity error separation between the main navigation filter and each respective inertial coast sub-filter; compute a velocity threshold for each of the inertial coast sub-filters, with the velocity threshold defined as a velocity uncertainty separation between the main navigation filter and each inertial coast sub-filter; and compare the velocity discriminator to the velocity threshold, for each inertial coast sub-filter, to detect if there is a fault in the aiding data.

Example 2 includes the system of Example 1, wherein the position discriminator comprises: a horizontal position discriminator for each inertial coast sub-filter, the horizontal position discriminator defined as a horizontal position error separation between the main navigation filter and each inertial coast sub-filter; and a vertical position discriminator for each inertial coast sub-filter, the vertical position discriminator defined as the vertical position error separation between the main navigation filter and each inertial coast sub-filter.

Example 3 includes the system of any of Examples 1-2, wherein the velocity discriminator comprises: a horizontal velocity discriminator for each inertial coast sub-filter, the horizontal velocity discriminator defined as the horizontal velocity error separation between the main navigation filter and each inertial coast sub-filter; and a vertical velocity discriminator for each inertial coast sub-filter, the vertical velocity discriminator defined as the vertical velocity error separation between the main navigation filter and each inertial coast sub-filter.

Example 4 includes the system of any of Examples 1-3, wherein at least one non-GNSS aiding sensor comprises a barometric pressure altitude sensor.

Example 5 includes the system of any of Examples 1-4, wherein: the main navigation filter comprises an extended Kalman filter (EKF); and the INS is configured to receive EKF state corrections from the main navigation filter.

Example 6 includes the system of any of Examples 1-5, wherein the inertial coasting monitor is operative to output an alert to the navigation system if a fault is detected in the aiding data.

Example 7 includes the system of any of Examples 1-6, wherein the inertial coasting monitor is operative to protect the navigation system from one or more GNSS threat events.

Example 8 includes the system of any of Examples 1-7, wherein the vehicle is an aircraft.

Example 9 includes a method comprising: providing an inertial coasting monitor in operative communication with a navigation system onboard a vehicle, the navigation system comprising a main navigation filter and an inertial navigation system (INS) operatively coupled to the main navigation filter, wherein the inertial coasting monitor includes a plurality of inertial coast sub-filters operatively coupled to the main navigation filter; receiving inertial measurements for the vehicle, in the inertial coasting monitor, from an onboard inertial measurement unit (IMU); receiving aiding data, in the inertial coasting monitor, from at least one aiding sensor onboard the vehicle, wherein the aiding data comprises non-GNSS aided data; performing a position detection process and/or a velocity detection process in the inertial coasting monitor; wherein the position detection process comprises: computing a position discriminator for each respective inertial coast sub-filter, with the position discriminator defined as a position error separation between the main navigation filter and each respective inertial coast sub-filter; computing a position threshold for each of the inertial coast sub-filters, with the position threshold defined as a position uncertainty separation between the main navigation filter and each inertial coast sub-filter; and comparing the position discriminator to the position threshold, for each inertial coast sub-filter, to detect if there is a fault in the aiding data; wherein the velocity detection process comprises: computing a velocity discriminator for each respective inertial coast sub-filter, with the velocity discriminator defined as a velocity error separation between the main navigation filter and each respective inertial coast sub-filter; computing a velocity threshold for each of the inertial coast sub-filters, with the velocity threshold defined as a velocity uncertainty separation between the main navigation filter and each inertial coast sub-filter; and comparing the velocity discriminator to the velocity threshold, for each inertial coast sub-filter, to detect if there is a fault in the aiding data.

Example 10 includes the method of Example 9, wherein the position discriminator is computed by a process comprising: computing a horizontal position discriminator for each inertial coast sub-filter, the horizontal position discriminator defined as a horizontal position error separation between the main navigation filter and each inertial coast sub-filter; and computing a vertical position discriminator for each inertial coast sub-filter, the vertical position discriminator defined as the vertical position error separation between the main navigation filter and each inertial coast sub-filter.

Example 11 includes the method of any of Examples 9-10, wherein the velocity discriminator is computed by a process comprising: computing a horizontal velocity discriminator for each inertial coast sub-filter, the horizontal velocity discriminator defined as the horizontal velocity error separation between the main navigation filter and each inertial coast sub-filter; and computing a vertical velocity discriminator for each inertial coast sub-filter, the vertical velocity discriminator defined as the vertical velocity error separation between the main navigation filter and each inertial coast sub-filter.

Example 12 includes the method of any of Examples 9-11, wherein the non-GNSS aided data is from a barometric pressure altitude sensor.

Example 13 includes the method of any of Examples 9-12, wherein: the main navigation filter comprises an extended Kalman filter (EKF); and the INS is configured to receive EKF state corrections from the main navigation filter.

Example 14 includes the method of any of Examples 9-13, further comprising outputting an alert to the navigation system if a fault is detected in the aiding data.

Example 15 includes the method of any of Examples 9-14, wherein the inertial coasting monitor is operative to protect the navigation system from one or more GNSS threat events.

Example 16 includes the method of any of Examples 9-15, wherein the vehicle is an aircraft.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:
1. A system comprising:
a plurality of aiding sensors onboard a vehicle, the aiding sensors including a Global Navigation Satellite System (GNSS) receiver, and at least one aiding sensor that comprises an altitude sensor;
an onboard inertial measurement unit (IMU) operative to produce inertial measurements for the vehicle;
a navigation system onboard the vehicle, the navigation system operatively coupled to the aiding sensors and the IMU, the navigation system comprising a main navigation filter and an inertial navigation system (INS) operatively coupled to the main navigation filter, wherein the main navigation filter is operative to receive aiding data from the aiding sensors including GNSS aided data, and the INS is operative to receive inertial data from the IMU and generate an inertial navigation solution for the vehicle; and
an onboard inertial coasting monitor in operative communication with the navigation system, the inertial coasting monitor operative to receive inertial data from the IMU and aiding data from the altitude sensor, the inertial coasting monitor comprising a set of inertial coast sub-filters, the inertial coasting monitor in operative communication with the main navigation filter, wherein each inertial coast sub-filter is aided by the inertial data from the IMU and the aiding data from the altitude sensor, wherein each inertial coast sub-filter provides a navigation solution that has not processed the GNSS aided data for a given number of seconds, wherein the given number of seconds varies for each sub-filter;
wherein the inertial coasting monitor is operative to perform a position detection process or a velocity detection process, or both the position detection process and the velocity detection process;
wherein the position detection process comprises:
compute a position discriminator for each respective inertial coast sub-filter, with the position discriminator defined as a position error separation between the main navigation filter and each respective inertial coast sub-filter;
compute a position threshold for each of the inertial coast sub-filters, with the position threshold defined as a position uncertainty separation between the main navigation filter and each inertial coast sub-filter; and
compare the position discriminator to the position threshold, for each inertial coast sub-filter, to detect if there is a fault in the aiding data;
wherein the velocity detection process comprises:
compute a velocity discriminator for each respective inertial coast sub-filter, with the velocity discriminator defined as a velocity error separation between the main navigation filter and each respective inertial coast sub-filter;
compute a velocity threshold for each of the inertial coast sub-filters, with the velocity threshold defined as a velocity uncertainty separation between the main navigation filter and each inertial coast sub-filter; and
compare the velocity discriminator to the velocity threshold, for each inertial coast sub-filter, to detect if there is a fault in the aiding data.

2. The system of claim 1, wherein the position discriminator comprises:
a horizontal position discriminator for each inertial coast sub-filter, the horizontal position discriminator defined as a horizontal position error separation between the main navigation filter and each inertial coast sub-filter; and a vertical position discriminator for each inertial coast sub-filter, the vertical position discriminator defined as the vertical position error separation between the main navigation filter and each inertial coast sub-filter.

3. The system of claim 1, wherein the velocity discriminator comprises:

a horizontal velocity discriminator for each inertial coast sub-filter, the horizontal velocity discriminator defined as the horizontal velocity error separation between the main navigation filter and each inertial coast sub-filter; and a vertical velocity discriminator for each inertial coast sub-filter, the vertical velocity discriminator defined as the vertical velocity error separation between the main navigation filter and each inertial coast sub-filter.

4. The system of claim 1, wherein the altitude sensor comprises a barometric pressure altitude sensor.

5. The system of claim 1, wherein:
the main navigation filter comprises an extended Kalman filter (EKF); and
the INS is configured to receive EKF state corrections from the main navigation filter.

6. The system of claim 1, wherein the inertial coasting monitor is operative to output an alert to the navigation system if a fault is detected in the aiding data.

7. The system of claim 1, wherein the inertial coasting monitor is operative to protect the navigation system from one or more GNSS threat events.

8. The system of claim 1, wherein the vehicle is an aircraft.

9. The system of claim 1, wherein the at least one aiding sensor further comprises a star tracker, or a Doppler velocity aiding sensor.

10. A method comprising:
providing a plurality of aiding sensors onboard a vehicle, the aiding sensors including a Global Navigation Satellite System (GNSS) receiver, and at least one aiding sensor comprising an altitude sensor;
providing an inertial coasting monitor in operative communication with a navigation system onboard the vehicle, the navigation system comprising a main navigation filter and an inertial navigation system (INS) operatively coupled to the main navigation filter, wherein the inertial coasting monitor includes a plurality of inertial coast sub-filters operatively coupled to the main navigation filter;
receiving inertial measurements for the vehicle, in the inertial coasting monitor, from an onboard inertial measurement unit (IMU);
receiving aiding data, in the inertial coasting monitor, from the at least one aiding sensor comprising the altitude sensor;
wherein each inertial coast sub-filter is aided by inertial data from the IMU and the aiding data from the altitude sensor, wherein each inertial coast sub-filter provides a navigation solution that has not processed GNSS aided data for a given number of seconds, wherein the given number of seconds varies for each sub-filter;
performing a position detection process or a velocity detection process, or both the position detection process and the velocity detection process, in the inertial coasting monitor;

wherein the position detection process comprises:
computing a position discriminator for each respective inertial coast sub-filter, with the position discriminator defined as a position error separation between the main navigation filter and each respective inertial coast sub-filter;
computing a position threshold for each of the inertial coast sub-filters, with the position threshold defined as a position uncertainty separation between the main navigation filter and each inertial coast sub-filter; and
comparing the position discriminator to the position threshold, for each inertial coast sub-filter, to detect if there is a fault in the aiding data;

wherein the velocity detection process comprises:
computing a velocity discriminator for each respective inertial coast sub-filter, with the velocity discriminator defined as a velocity error separation between the main navigation filter and each respective inertial coast sub-filter;
computing a velocity threshold for each of the inertial coast sub-filters, with the velocity threshold defined as a velocity uncertainty separation between the main navigation filter and each inertial coast sub-filter; and
comparing the velocity discriminator to the velocity threshold, for each inertial coast sub-filter, to detect if there is a fault in the aiding data.

11. The method of claim 10, wherein the position discriminator is computed by a process comprising:
computing a horizontal position discriminator for each inertial coast sub-filter, the horizontal position discriminator defined as a horizontal position error separation between the main navigation filter and each inertial coast sub-filter; and
computing a vertical position discriminator for each inertial coast sub-filter, the vertical position discriminator defined as the vertical position error separation between the main navigation filter and each inertial coast sub-filter.

12. The method of claim 10, wherein the velocity discriminator is computed by a process comprising:
computing a horizontal velocity discriminator for each inertial coast sub-filter, the horizontal velocity discriminator defined as the horizontal velocity error separation between the main navigation filter and each inertial coast sub-filter; and
computing a vertical velocity discriminator for each inertial coast sub-filter, the vertical velocity discriminator defined as the vertical velocity error separation between the main navigation filter and each inertial coast sub-filter.

13. The method of claim 10, wherein the altitude sensor comprises a barometric pressure altitude sensor.

14. The method of claim 10, wherein:
the main navigation filter comprises an extended Kalman filter (EKF); and
the INS is configured to receive EKF state corrections from the main navigation filter.

15. The method of claim 10, further comprising outputting an alert to the navigation system if a fault is detected in the aiding data.

16. The method of claim 10, wherein the inertial coasting monitor is operative to protect the navigation system from one or more GNSS threat events.

17. The method of claim 10, wherein the vehicle is an aircraft.

18. The method of claim 10, wherein the at least one aiding sensor further comprises a star tracker, or a Doppler velocity aiding sensor.

* * * * *